United States Patent [19]
Dosaj et al.

[11] Patent Number: 4,981,668
[45] Date of Patent: Jan. 1, 1991

[54] SILICON CARBIDE AS A RAW MATERIAL FOR SILICON PRODUCTION

[75] Inventors: Vishu D. Dosaj, Midland; Alvin W. Rauchholz, Hemlock; Martin D. Young, Midland, all of Mich.; Gary N. Bokerman, Madison, Ind.

[73] Assignee: Dow Corning Corporation, Midland, Mich.

[21] Appl. No.: 206,633

[22] Filed: Jun. 14, 1988

Related U.S. Application Data

[63] Continuation-in-part of Ser. No. 30,653, Mar. 25, 1987, abandoned, which is a continuation-in-part of Ser. No. 857,207, Apr. 29, 1986, abandoned.

[51] Int. Cl.$^5$ ............ C01B 33/02; C01B 31/36; C07C 27/26; C07C 27/06
[52] U.S. Cl. .............................. 423/350; 423/349; 423/346; 518/702; 518/713; 568/888
[58] Field of Search .............. 423/349, 350, 346; 204/64 R; 518/702, 713; 568/888

[56] References Cited

U.S. PATENT DOCUMENTS

| | | | |
|---|---|---|---|
| 875,672 | 12/1907 | Toner | 423/350 |
| 908,130 | 12/1908 | Potter | 423/350 |
| 2,823,983 | 2/1958 | Udy | 23/223.5 |
| 3,660,298 | 5/1972 | McClincy et al. | 252/188.3 |
| 3,887,359 | 6/1975 | Enger et al. | 75/11 |
| 4,213,599 | 7/1980 | Dewing et al. | 266/166 |
| 4,247,528 | 1/1981 | Dosaj et al. | 423/350 |
| 4,269,620 | 5/1981 | Johannson | 75/11 |
| 4,279,781 | 7/1981 | Dienes et al. | 252/463 |
| 4,366,137 | 12/1982 | Lask | 423/350 |
| 4,377,564 | 3/1983 | Dahlberg | 423/349 |
| 4,439,410 | 3/1984 | Santen et al. | 423/350 |
| 4,457,902 | 7/1984 | Watson | 423/350 |
| 4,519,999 | 5/1985 | Coleman et al. | 423/337 |

FOREIGN PATENT DOCUMENTS

| | | |
|---|---|---|
| 0177894 | 4/1986 | European Pat. Off. . |
| 0208567 | 1/1987 | European Pat. Off. . |
| 1310789 | 10/1962 | France . |
| 49-37686 | 10/1974 | Japan ................ 423/350 |
| 119176 | 5/1958 | U.S.S.R. .............. 423/350 |
| 18659 | of 1900 | United Kingdom ....... 423/350 |
| 2078698A | 1/1982 | United Kingdom ....... 423/348 |
| 2150128A | 6/1985 | United Kingdom ....... 423/350 |

OTHER PUBLICATIONS

Muller et al., Scand. J. Metall., 1 (1972) pp. 145–155.
Miller et al., J. Am. Ceram. Soc., (1979) 62:3–4, pp. 147–149.
Kennedy et al., Proc. Br. Ceram. Soc., 33:Far. Sci. 3(1983), pp. 1–15.
Jorgensen et al., Electric Furnace Conference Proceedings, vol. 41, Detroit, 1988.
Chemical Abstracts, vol. 82:24, 6/16/75, p. 180, Abstract No. 159017a.
Chemical Abstracts, vol. 69:12, 9/16/68, Abstract No. 48877t.
Elektorwarme International, vol. 34:B2, 4/76, pp. B81–B84.

Primary Examiner—Gary R. Straub
Attorney, Agent, or Firm—Allan O. Maki; Carl A. Yorimoto

[57] ABSTRACT

What is described is a process for the production of silicon via the carbothermic reduction of silicon dioxide in which silicon carbide is fed as the total reductant source or as a portion of the reductant input. The process also includes recovery and recycle to the furnace silicon monoxide and other silicon-containing materials from the by-produced gases from the furnace to maximize raw material efficiency. Finally, the process includes the recovery of value from the by-produced gases via the use of the gases as a chemical intermediate or the use of the gases as a fuel for a combustion process.

18 Claims, 1 Drawing Sheet

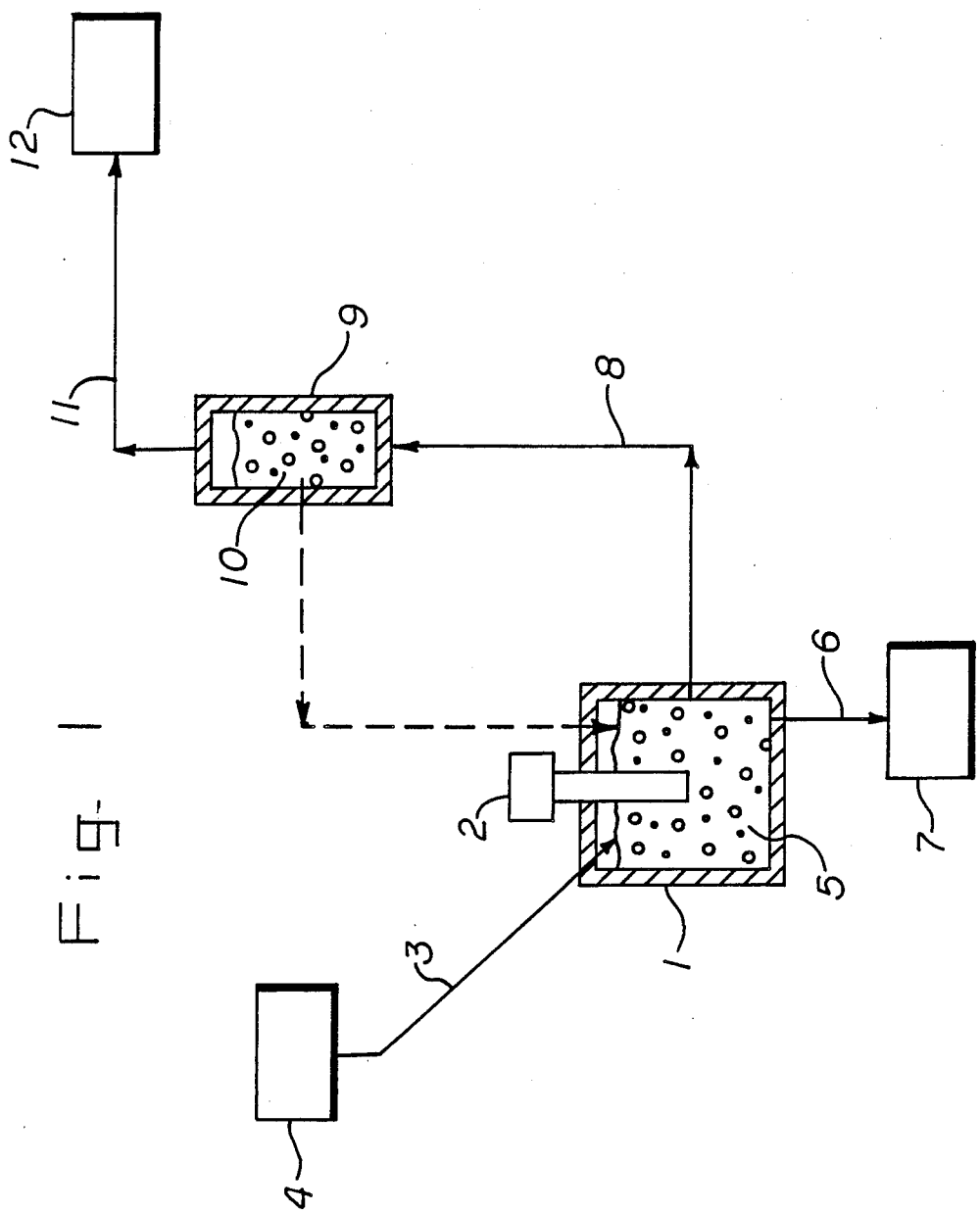

SILICON CARBIDE AS A RAW MATERIAL FOR SILICON PRODUCTION

BACKGROUND OF THE INVENTION

This application is a continuation-in-part of application Ser. No. 030,653, filed Mar. 25, 1987, now abandoned. Application Ser. No. 030,653 is a continuation-in-part of application Ser. No. 857,207, filed Apr. 29, 1986, now abandoned.

This invention relates to a process for the carbothermic reduction of silicon dioxide to prepare silicon in which silicon carbide is fed as the total reductant source or as a portion of the reductant input.

At present, silicon is typically produced in a submerged electric arc furnace via the carbothermic reduction of silicon dioxide ($SiO_2$) with a solid carbonaceous reducing agent. The carbonaceous material has typically been in the form of charcoal, coal, coke, wood chips, and the like. The overall reduction reaction can be represented by the equation $$SiO_2 + 2C = Si + 2CO$$

It is generally recognized that the above reaction in reality involves multiple reactions, the most significant being outlined below:

$$SiO_2 + 3C = SiC + 2CO \quad (1),$$

$$SiO_2 + C = SiO + CO \quad (2),$$

$$SiO + 2C = SiC + CO \quad (3),$$

$$2SiO_2 + SiC = 3SiO + CO \quad (4), \text{ and}$$

$$SiO + SiC = 2Si + CO \quad (5),$$

Muller et al., Scand. J. Metall., 1 (1972) pp. 145–155, describe and define the theoretical equilibrium conditions for the Si-O-C chemical system of the carbothermic reduction of silicon dioxide to form silicon. Reaction (1), supra, is endothermic and is estimated to consume as much as 50 percent of the energy for the overall reduction reaction.

The use of a submerged electric arc furnace for the production of silicon has been used on a commercial basis for many years More recently the use of a transferred arc plasma as an energy source for the carbothermic reduction of silicon dioxide has been utilized The Present practice of feeding $SiO_2$ and a solid carbonaceous reducing agent to a submerged electric arc furnace has many shortcomings. Mass transfer is difficult in handling this complex reaction system of solid, molten, and gaseous reactants, intermediates and products. Heat transfer is also difficult because of the mass transfer problems and the endothermic nature of reaction (1) supra. A further difficulty is the loss of material in the form of volatile silicon monoxide (SiO) with the by-produced gases of the reaction It is estimated that in present submerged arc furnaces as much as 10 to 20 weight Percent of the ultimate silicon yield is lost as SiO. SiO reoxidizes to form solid $SiO_2$. At temperatures of approximately 1500° C. or lower SiO is thought to disproportionate to finely dispersed silicon and $SiO_2$. The finely dispersed silicon and $SiO_2$ can agglomerate as larger solid Particles on cool surfaces. As a consequence, SiO that exits with the by-produced gases poses problems not only of material loss but plugging problems throughout the process. Further, the solid Particles of silicon and $SiO_2$ are very abrasive. Thus, the presence of solid particles of silicon and $SiO_2$ in the by-produced gases would make recovery of value from these gases via use as a chemical intermediate or via recovery of energy content impractical. $SiO_2$ that escapes from the system poses an environmental problem as an airborne particulate that must be collected and discarded, with considerable difficulty.

The use of silicon carbide (SiC) in place of a solid carbonaceous reducing agent or the use of SiC, supplemented by a solid carbonaceous reducing agent, improves the operation of a furnace 1 to reduce $SiO_2$. Since the formation of SiC is endothermic and consumes as much as 50 percent of the overall energy required for the reduction reaction the heat load on the furnace is significantly reduced. The simultaneous melting of $SiO_2$ and contacting with SiC improves mass transfer in silicon reduction furnaces and, thus furnace process efficiency.

Enger et al. in U.S. Pat. No. 3,887,359, issued June 3, 1975, disclose the feeding of SiO2 and carbon separately in separate zones of an electric arc furnace wherein the reaction gases pass through one or more zones rich in carbon. This invention is an attempt to minimize the losses of SiO. Enger et al. do not disclose a separate operation after the furnace to convert SiO to SiC nor do they disclose the use of SiC as a primary feed to the furnace.

Miller et al., J. Am. Ceram. Soc (1979) 62:3–4, pp. 147–149, disclose the reduction of $SiO_2$ with carbon and SiC to form SiO. No mention is made of the formation of silicon.

Dewing et al. in U.S. Pat. No. 4,213,599, issued July 22, 1980, disclose the use of a carbon bed in series with a bed of alumina to scrub the off-gases from the carbothermic reduction of alumina to form aluminum. No disclosure is made of the feed of an aluminum carbide as the primary reductant feed to the furnace. No disclosure is made of the applicability of this technology to the manufacture of silicon.

Kennedy and North, Proc. Br. Ceram. Soc., 33:Far. Sci. 3 (1983), pp. 1–15, disclose the production of fine SiC powder by the reaction of SiO with particulate carbon. SiC powder is the desired product. No disclosure is made of the use of SiC to prepare silicon.

It is an objective of the instant invention to improve raw material and energy utilization and subsequently the overall manufacturing cost of silicon.

It has been unexpectedly found that in the production of silicon via the carbothermic reduction of $SiO_2$ in an electric furnace the feeding of a mixture of $SiO_2$SiC, and a solid carbonaceous reducing agent greatly improves the rate of silicon production, compared to the reaction of $SiO_2$ and a solid carbonaceous reducing agent alone. Additionally, it has been found that the electrical energy consumption for the carbothermic reduction of this SiC-containing mixture is significantly lower than the energy consumption that is required when $SiO_2$ and a carbonaceous material are the feed for the same furnace. These unexpected findings are discussed infra and illustrated in the examples.

BRIEF DESCRIPTION OF THE DRAWING

The instant invention will become better understood by those skilled in the art from a consideration of the attached schematic drawing.

FIG. 1 is a schematic representation to illustrate one embodiment of the instant invention FIG. 1 outlines (a) a silicon furnace with an electrical energy source, (b) a means for feeding the silicon dioxide and silicon carbide reactants to the furnace, (c) a means for removing silicon monoxide or other silicon-containing materials from the by-produced gas stream leaving the reaction zone of the furnace (d a means for recover. in the chemical or energy value of the by-produced gas stream, and (e) a means for recovering molten silicon leaving the reaction zone.

DETAILED DESCRIPTION OF THE DRAWING

In FIG. 1, 1 is a representation of the furnace body. The furnace body 1 can be a refractory-lined, tank-type vessel or the like, known in the art of design of metallurgical equipment. The electrical energy source 2 is integral to the furnace body, it being understood that the position of the energy source is for illustrative purposes and not as a limitation. The electrical energy source may be a submerged electrode (as represented by 2 in FIG. 1) or a transferred arc plasma, both of which are known in the art of transferring of electrical energy to silicon furnaces. The solid reactants, silicon dioxide and silicon carbide, are fed to the furnace body 1 and to the electrical energy source 2 as a mixed solid feed stream 3. The mixed feed of solid reactants 3 is fed to the furnace body 1 by a means 4 for feeding the solid reactants. The means 4 for feeding the solid reactants can be any conventional means such as gravity feed or gas Pressure in combination with a gas-lock valve, screw feeders, pneumatic conveyors, and the like The furnace body 1 is partially filled with a bed 5 of solid reactants. The bed 5 of solid reactants can be silicon carbide alone or a mixture of silicon dioxide and silicon carbide. The product silicon leaves the furnace body 1 as a stream 6 of molten silicon. The stream 6 of molten silicon is recovered by a means 7 for recovering molten silicon. This means 7 for recovering molten silicon can be any such techniques as batch or continuous tapping. A by-produced gas stream 8 leaves the furnace body 1, it being understood that the position, as shown, of the point at which the by-produced gas stream 8 leaves the furnace body is for illustrative purposes and not as a limitation. The by-produced gas stream 8 which contains gaseous silicon monoxide or finely dispersed silicon and silicon dioxide, is passed to a means for removing these silicon containing materials from the by- produced gas stream 8. For this particular embodiment of the instant invention this means for removing silicon-containing materials is a carbon bed which is shown to be a cylindrical, tank-type vessel 9, of known design in the art of tank design, filled with a bed 10 of carbon. The bed 10 of carbon converts any silicon monoxide in the by-produced gas stream 8 into silicon carbide, thus effectively removing any silicon monoxide. The bed 10 of carbon would also agglomerate and trap any finely dispersed silicon or silicon dioxide. The bed 10 of carbon so converted to silicon carbide or coated with agglomerated silicon or silicon dioxide may be periodically fed to the furnace body 1 for ultimate conversion to silicon. A solids-free stream 11 of by-produced gases, which stream is composed mainly of carbon monoxide and other combustible gases, is passed on to a means 12 for recovery of the value of these carbon-containing and hydrogen-containing gases. This means 12 for recovery can be such conventional means as utilization of the gases as a chemical intermediate or combustion in a steam boiler or combustion in a gas turbine which is coupled to a generator to produce electricity.

DESCRIPTION OF THE INVENTION

In accordance with the instant invention there is provided a process to produce silicon using silicon carbide as a reducing agent feed under conditions that will be delineated herein. What is described therefore, is a process for producing silicon via the carbothermic reduction of silicon dioxide, said process comprising (A) feeding silicon dioxide and silicon carbide to a furnace as solid reactants, wherein proportions of silicon dioxide and silicon carbide are controlled so that the silicon dioxide and silicon carbide are essentially in stoichiometric balance for the overall reaction to produce silicon;

(B) charging the furnace with an electrical energy source to effect chemical and physical changes to the solid reactants to produce molten silicon;

(C) recovering molten silicon from the furnace; and (D) passing by-produced gases from the furnace to a bed of carbon to convert gaseous silicon monoxide to solid silicon carbide and to agglomerate and trap finely dispersed silicon and silicon dioxide, wherein said bed of carbon is positioned physically external to the furnace.

Silicon can be successfully produced by the carbothermic reduction of silicon dioxide with silicon carbide as the sole reductant source. However, for practical reasons the presence of some portion of a solid carbonaceous reducing agent in addition to the silicon carbide is desirable for the carbothermic reduction of silicon dioxide. As an example, silicon carbide is a very dense solid and, as such, a charge of silicon carbide and silicon dioxide in a reducing furnace would have a high bulk density. The high bulk density of the furnace charge would hinder efficient transfer of electrical energy and would result in unstable furnace operation. Addition of a solid carbonaceous reducing agent would "fluff up" the furnace charge, reducing the bulk density of the furnace charge, and facilitating more stable operation of the furnace.

Thus, for the purpose of this invention the silicon carbide can also be a reductant feed with other solid carbonaceous reducing agents. As such, what is described is a process for producing silicon via the carbothermic reduction of silicon dioxide, said process comprising (A) feeding silicon dioxide, silicon carbide, and a solid carbonaceous reducing agent to a furnace as solid reactants, wherein Proportions of silicon dioxide, silicon carbide, and solid carbonaceous reducing agent are controlled so that the silicon dioxide, the silicon carbide, and silicon carbide equivalent of the carbonaceous reducing agent are essentially in stoichiotric balance for the overall reaction to produce silicon;

(B) charging the furnace with an electrical energy source to effect chemical and physical changes to the solid reactants to produce molten silicon;

(C) recovering molten silicon from the furnace; and (D) passing by-produced gases from the furnace to a bed of carbon to convert gaseous silicon monoxide to solid silicon carbide and to agglomerate and trap finely dispersed silicon and silicon dioxide, wherein said bed of carbon is positioned physically external to the furnace.

The electrical energy source can be provided by such known means as a submerged arc furnace utilizing a conventional carbon electrode. The submerged arc furnace is the primary commercial process presently utilized to produce silicon via the carbothermic reduction of silicon dioxide and a carbonaceous reducing agent. The energy source can also be provided by a gas plasma. The plasma is in a transferred arc configuration. Plasmas are known in the art and can be similar to the design of units utilized in smelting of silicon and other metals, primarily steel.

Feeding of silicon dioxide and silicon carbide and, alternatively, silicon dioxide, silicon carbide, and a solid carbonaceous reducing agent into the furnace and to the electrical energy source can be effected by conventional means such as gravity feed or gas pressure in combination with a gas-lock valve, screw feeders, pneumatic conveyors, and the like. The silicon dioxide and the silicon carbide, and, alternatively, the silicon dioxide the silicon carbide, and the solid carbonaceous reducing agent may be fed separately or as a combined mixture by conventional means, as described supra. For separate feeds the control of the proportions of each feed is effected by such known means of control as manual control, automated control, and the like.

The reaction of silicon dioxide and silicon carbide is represented by the following reactions, described supra:

$$2SiO_2 + SiC = 3SiO + CO \qquad (4)$$

and $$SiO + SiC = 2Si + CO \qquad (5).$$

Combining reactions (4) and (5) yield an overall reaction, $$SiO_2 2SiC = 3Si + 2CO \qquad (6).$$

Therefore, from the above overall reaction (6) the stoichiometric quantities are 2 moles of silicon carbide per mole of silicon dioxide. It is understood that less than the stoichiometric quantity of silicon carbide relative to silicon dioxide can be utilized, however, with the penalty that silicon raw material efficiency will be reduced by loss of unconsumed silicon monoxide. It is further understood that greater than the stoichiometric quantity of silicon carbide relative to silicon dioxide can be utilized, however, with a resultant build-up of silicon carbide in the silicon furnace. For purposes of this invention "essentially in stoichiometric balance for the overall reaction" means that the molar Proportion of the silicon carbide relative to silicon dioxide is at or up to 1 to 2 percent above the stoichiometric quantity In the addition of silicon dioxide, silicon carbide, and a solid carbonaceous reducing agent, "essentially in stoichiometric balance for the overall reaction" means that combined molar proportion of silicon carbide equivalent, from the combined feed of silicon carbide and the carbonaceous reducing agent, relative to the silicon dioxide is at or up to 1 to 2 percent above the stoichiometric quantity. "The silicon carbide equivalent" of the solid carbonaceous reducing agent is defined by the overall reaction of silicon dioxide with carbon and reaction (6), supra, $$SiO_2 + 2C = Si + 2CO \qquad \text{and}$$

$$SiO_2 + 2SiC = 3Si + 2CO \qquad (6).$$

These two reactions show that silicon carbide can be supplemented with carbon on an equivalent molar basis.

The silicon dioxide which is fed separately or combined in a mixture with silicon carbide or alternatively in a mixture with silicon carbide and a solid carbonaceous reducing agent is selected from a group which consists of quartz, in its many naturally occurring forms (such as sand), and fused and fume silica in their many forms. The form of the silicon dioxide is selected from a group which consists of powders granules, lumps, pebbles pellets, and briquettes.

The silicon carbide which is fed separately or combined in a mixture with silicon dioxide or alternatively in a mixture with silicon dioxide and a solid carbonaceous reducing agent is selected from a group which consists of alpha-silicon carbide and beta-silicon carbide. The form of the silicon carbide is selected from a group which consists of powders, granules, lumps, pebbles, pellets, and briquettes. The source of silicon carbide can be (1) the reaction of silicon dioxide and carbon, the so-called Atcheson reaction, (2) the reaction of silicon monoxide and carbon, and (3) the heating of rice hulls.

The solid carbonaceous reducing agent which is fed alternatively as a supplement to the silicon carbide is selected from a group which consists of carbon black, charcoal, coal, coke, and wood chips. The form of the solid carbonaceous reducing agent is selected from a group which consists of powders, granules, chips, lumps, pellets, and briquettes.

The mixture of silicon dioxide and silicon carbide and in the alternative silicon dioxide, silicon carbide, and a solid carbonaceous reducing agent can be in the form selected from a group which consists of powders, granules, lumps, pebbles, pellets, and briquettes.

The preferred mode of feeding the furnace and its electrical energy source is a single feed stream which is a mixture of silicon dioxide, silicon carbide, and a solid carbonaceous reducing agent. The presence of a solid carbonaceous reducing agent is desirable to maintain the bulk density of the solid charge of solid reactants at a level for stable furnace operation. The proportion of silicon carbide in the total reductant feed is preferably 10 to 90 percent on a molar carbon basis. More preferably, the proportion of silicon carbide in the total reductant feed is 20 to 50 percent on a molar carbon basis.

The furnace may be partially filled with one or more of the solid reactants—silicon dioxide, silicon carbide, or alternatively, a solid carbonaceous reducing agent. The solid reactants that partially fill the furnace are in the form selected from a group which consists of powders, granules, lumps, pebbles, pellets, and briquettes. The partial filling of the furnace is considered to allow adequate space to accommodate the formation of solids from the reaction of silicon dioxide and silicon carbide or additionally a carbonaceous reducing agent. Preferably the solid reactants with which the furnace is partially filled is a mixture of quartz or silica, alpha-silicon carbide or beta-silicon carbide, and a solid carbonaceous reducing agent.

The furnace is designed so that Pressures in the range of atmospheric pressure to 6 atmospheres can be maintained. Operation of a closed furnace at atmospheric pressure or higher better facilitates the recovering of the by-produced gases after the gases exit the furnace.

"Recovering molten silicon" means any conventional means of removing the molten silicon product from the reaction zone by such known techniques as batch or continuous tapping.

From the reactions described, supra, one of the intermediates in the reduction process is silicon monoxide (SiO). Based upon the stoichiometric amount of carbon monoxide generated in a silicon furnace, the gas could contain as much as 20 percent by weight silicon monoxide. At the temperatures of the reaction SiO is a gas. As the temperature of the by-produced gases leaving the silicon furnace cool to approximately 1500° C. or lower, the SiO is thought to disproportionate to a mixture of silicon and SiO₂. The disproportionation of SiO can be represented by the reaction

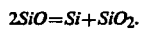
$$2SiO = Si + SiO_2.$$

The silicon and SiO₂ so formed would be a finely dispersed solid in the by-produced gas stream It is estimated that as much as 10 to 20 percent of the silicon in the SiO₂ fed in present silicon furnaces is lost as gaseous SiO or as silicon and SiO₂ from the disproportionation of SiO. SiO will also react with oxygen to form solid SiO₂. The presence of silicon monoxide in the by-produced gases from a silicon furnace is a severe hindrance in the ability to recover these gases and to subsequently use the gases as a feed to a process for producing useful chemical compounds or as a fuel for a combustion process. The presence of SiO, silicon, or SiO₂ causes mechanical difficulties for chemical processing equipment or combustion equipment. As an example of these difficulties, the formation of solids would cause plugging problems with process piping and equipment. Further, the formation of silicon-containing solids cause erosive effects to moving equipment. Additionally, the formation of solids would coat and foul catalytic surfaces in the reaction of these by-produced gases into useful chemical compounds. Further, solid silicon-containing materials would fuse to glass at the temperatures in a combustion chamber causing severe restriction to heat-transfer. Therefore, it is a necessity to remove silicon monoxide and other silicon-containing materials from the by-produced gases from a silicon furnace before the gases can be recovered and utilized.

The means for recovering silicon monoxide or finely dispersed silicon and silicon dioxide from the by-produced gases is passing the gases to a bed of carbon to convert the gaseous silicon monoxide to solid silicon carbide and to agglomerate and trap the finely dispersed silicon and silicon dioxide. The bed of carbon is located physically external to the silicon furnace in another piece of equipment. The reaction of silicon monoxide with carbon to form silicon carbide is known in the art. A bed of carbon can be any conventional bed configuration such as a packed bed, a fluidized bed, a stirred bed, and the like that will facilitate effective contact of the gaseous silicon monoxide or the finely dispersed silicon and silicon dioxide with the solid carbon. The by-produced gases can be passed from the silicon furnaces to the externally located bed of carbon by any known means for carrying gases. An example of such means for conveying gases would be interconnecting conduits or pipes in which the gases would be moved by the pressure within the silicon furnace. The carbon can be in a form selected from a group which consists of powders, granules, lumps, pellets, and briquettes. The bed of carbon and silicon-containing materials can be discarded.

As noted, supra, gaseous SiO is thought to disproportionate to finely dispersed, solid silicon and SiO₂ at temperatures of approximately 1500° C. or lower It is desirable to maximize conversion of SiO exiting from the furnace to silicon carbide. Therefore, it is Preferred that the bed of carbon located external to the furnace be maintained at a temperature greater than about 1500° C. to maintain SiO in a gaseous state. Gaseous SiO will in turn react with carbon to form silicon carbide. Maintaining the carbon bed at a temperature of greater than about 1500° C. can be effected by such means as insulation of equipment and piping and heating of the bed of carbon. Heating the bed of carbon can be effected by any known means such as, for example, direct heating with electrical resistance heaters, or heating a jacketed bed with gas heated by combustion or electrical means.

The external bed of carbon can be operated at temperatures below 1500° C. However, it is understood that the proportion of SiO lost from the furnace that is converted to silicon carbide will be lowered. In any event, recovery of SiO lost from the furnace will still be effected.

To further reduce the loss of raw materials, the bed of carbon which contains silicon carbide Produced from silicon monoxide and other solid, silicon-containing materials which are trapped in the carbon bed can be recycled to the silicon furnace. Recovering the silicon monoxide and other silicon-containing materials from the by-produced gases is desirable since recovering and recycling of these silicon-containing materials to the furnace maximizes raw material utilization.

At present by-produced gases from silicon furnaces are handled by direct disposal techniques such as venting or burning. Venting causes problems because of emission of hydrocarbons and silicon-containing material to the atmosphere. Flaring suffers from the air emission difficulties related to the discharge of silicon dioxide. A representation of a possible composition of silicon furnace gas is as follows:

CO: 42%
H₂: 29%
CH₄: 12%
Air: 2%
CO₂: 1%
H₂O: 14%.

The by-produced gases have sufficient carbon and hydrogen content to be utilized as a chemical intermediate or as a combustible fuel. The above gas mixture has an energy or heating value of approximately 250 to 300 British Thermal Units (BTU)/ standard cubic feet of gas. The above by-produced gases could be used as a fuel for combustion in such known processes as a boiler for the generation of steam. Additionally, the by-produced gases could be used for combustion in a gas turbine which is coupled to an electric generator. The electricity so generated could supplement much of the electricity needed for operation of the silicon furnace.

From the representation of the by-produced gases, supra, carbon monoxide and hydrogen are the primary components of the by-Produced gases. Carbon monoxide is known as a valuable raw material in the preparation of organic chemicals such as alcohols, ketones, aldehydes, amines, carboxylic acids, and the like An example of a preferred use of carbon monoxide as a chemical intermediate is the preparation of methanol in which carbon monoxide and hydrogen are reacted in the presence of a solid catalyst. Such a reaction to prepare methanol from carbon monoxide is described by Dienes et al., in U S. Pat. No. 4,279,781 issued July 21, 1981. Dienes et al., disclose a solid catalyst for the reaction of carbon monoxide and hydrogen to produce methanol. The solid catalyst disclosed by Dienes et al., comprises a major portion by weight of oxides of copper and zinc and a minor portion by weight of a thermal stabilizing metal oxide such as aluminum oxide. Any hydrocarbon-containing gas in the by-produced gases from a silicon furnace, could also be utilized as a chemical intermediate. An example of utilization of the hydrocarbon-containing gases would be the reaction of these gases with steam, via the known steam reforming technique to produce additional carbon monoxide.

The following examples are presented to be illustrative of the instant invention and are not to be construed as limiting the instant invention delineated in the claims.

EXAMPLE 1: (Not within the scope of the invention)

A series of 10 runs was made in a small silicon furnace with conventional charge of silicon dioxide and solid carbonaceous material to establish a baseline against which to compare the results of similar runs employing the instant invention. The silicon furnace utilized was a 200 kVA direct arc reactor.

The raw materials utilized were:
1. Silicon dioxide as quartz from two sources, British Columbia white quartz and North Carolina gravel
2. Coal from sources in Kentucky and Oklahoma
3. Green petroleum coke from two sources, Koch Carbon Company, Oak Brooke, Illinois, and Great Lakes Carbon Company
4. Hard and soft wood chips The silicon dioxide and solid carbonaceous materials were mixed together and fed to the silicon furnace in discrete charges with composition:

| Material | Wt., kg. |
|---|---|
| Quartz | 6.0 |
| Coal | 2.5 |
| Coke | 0.5 |
| Wood Chips | 2.3 |

The following general Procedure was followed in carrying out the individual runs in this series:
1. The furnace was loaded with three to four charges of silicon dioxide/carbonaceous material mix
2. The power level was slowly brought up to 100 kW
3. At approximately every 150 kWh of energy fed to the furnace or approximate]y every 1.5 to 2 hours
   a. the silicon metal was tapped
   b. the furnace was stoked
   c. another charge was added to the furnace
4. "Equilibrium" or steady state conditions measured after the run had proceeded for 24 hrs.

As noted above, the runs were allowed to proceed for 24 hours to reach an "equilibrium" or steady state condition. Total run time varied, but steady state conditions were generally maintained from 30 to 40 hours. From the data collected from these 10 runs, three measures of reactor performance were computed. These measures of performance, the definition of these measures of performance, and the values of the particular measurements are listed below:

Energy Consumption - Kilowatt-hours of electricity required to produce one kilogram of silicon (kWh/kg Si)=30.2±3.5

Percent Silicon Yield - (Kilograms of silicon recovered/ kilograms of combined silicon in the feed) x 100=72.2±5.2

Production Rate - Kilograms of silicon produced per hour=2.48±0.27

These results are baseline conditions upon which the results of the following examples are compared.

EXAMPLE 2

A run was made in which beta-silicon carbide was substituted for a portion of the carbonaceous material fed to a silicon furnace. The furnace utilized was the same 200 kVA direct arc furnace utilized in Example 1.

The raw materials used were:
1. Sand from a source in Oklahoma
2. Lump quartz as Mt Rose quartz from a source in British Columbia Lump size was up to 2¼".
3. Beta-Silicon carbide granules manufactured by Ultra Carbon Corp., Bay City, Michigan
4. The coal used was Renwood Blue Gem Coal purchased from Hickman-Williams & Co , Kentucky The coal was used in lump form or ground for briquetting.
5. Woodchips were a mix of hard and soft wood purchased from Morbark of Winn, Michigan. Chip sizes up to 1½" were used.

The operating procedures used in this run were essentially the same as those used in Example 1. However, the furnace run was begun with a furnace charge of silicon dioxide and carbonaceous materials, similar to charge material utilized in Example 1. Once the furnace run was established, the charge was changed to a charge containing beta-silicon carbide. The beta-silicon carbide-containing charges consisted of a mixture of (a) lump Mt. Rose quartz, (b) briquettes of a mixture of coal, beta-silicon carbide, and sand, and (c) wood chips. The composition of the beta- silicon carbide-containing charge is given below:

| Material | Wt., kg |
|---|---|
| Quartz | 2.7 |
| Briquettes | |
| Coal | 1.5 |
| Beta-SiC | 1.3 |
| Sand | 1.4 |
| Wood Chips | 2.5 |

Again, as in Example 1 the run was allowed to proceed for 24 hours to reach an "equilibrium" or steady state. The results of steady state operation were:

Energy Consumption=18.11 kWh/kg Si

Silicon Yield=73.71%

Production Rate=3.99 kg Si/hr

These above results demonstrate that the use of beta-silicon carbide as a portion of the solid reducing agents in a silicon charge significantly reduces the energy consumption to Produce silicon and significantly increases the silicon production rate compared to the standard feeding of silicon dioxide and carbonaceous reducing agents.

EXAMPLE 3

A silicon furnace run was made in which alpha-silicon carbide was substituted for a portion of the carbonaceous material fed with silicon dioxide.

The raw materials used in this run were the same as those used in Example 2, except that alpha-silicon carbide was used in Place of beta-silicon carbide. The alpha-silicon carbide used purchased from General Abrasive, a Division of Dresser Corp., Niagara Falls, New York. The alpha-silicon carbide was in the form of a material 10 grit and finer (75% 70-mesh or larger).

The silicon furnace was started with an alpha-silicon carbide-containing charge which was a mixture of (a) lump Mt. Rose quartz, (b) briquettes which consisted of a mixture of coal, alpha-silicon carbide, and sand and (c) wood chips. The alpha silicon carbide-containing charge fed to the furnace had the following composition:

| Material | Wt., kg |
|---|---|
| Quartz | 2.8 |
| Briquettes | |
| Coal | 1.4 |
| Alpha-SiC | 1.2 |
| Sand | 1.3 |
| Wood Chips | 1.9 |

Again, as in Example 1, the run was allowed to proceed for 24 hours to reach an "equilibrium" or steady state. The results of steady state operation were:

Energy Consumption=15.68 kWh/kg Si

Silicon Yield=81.64%

Production Rate=4.44 kg Si/hr

These above results demonstrate that the use of alpha-silicon carbide as a portion of the solid reducing agents in a silicon furnace charge significantly reduces the energy consumption to produce silicon and significantly increases the silicon production rate compared to the standard feeding of silicon dioxide and carbonaceous reducing agents. These results also demonstrate that similar results are attained in substituting either alpha-silicon carbide or beta-silicon carbide for a portion of the carbonaceous material fed to a silicon furnace.

Table 1 is a summary of the results of Examples 1, 2, and 3. "Energy Consumption" is expressed as kilowatthours/kilogram of silicon. "Production Rate" is expressed as kilograms of silicon/hour.

TABLE 1

| Example | Energy Consumption | Production Rate |
|---|---|---|
| 1 | 30.2 ± 3.5 | 2.48 ± 0.27 |
| 2 | 18.11 | 3.99 |
| 3 | 15.68 | 4.44 |

EXAMPLE 4

A gas mixture simulating the by-produced gases from a silicon furnace was evaluated as a chemical intermediate. The basis for the composition of the gas mixture evaluated was the representative composition of a silicon furnace gas, presented supra. A custom mixture of gas was prepared by Linde Corporation. The gas mixture was compressed and charged into a gas cylinder. The gas pressure in the cylinder was approximately 1800 pounds per square inch, gauge (psi). Table 2 is a comparison of the composition of the custom gas mixture (designated as "Custom Mixture") to the representative composition (designated "Theory"). Composition in volume percent is designated %.

TABLE 2

| Component | Custom Mixture | Theory |
|---|---|---|
| CO | 44.5% | 42% |
| $H_2$ | 30.5% | 29% |
| $CH_4$ | 14.5% | 12% |
| $O_2$ | 0.4% | 0.4% |
| $N_2$ | 1.4% | 1.6% |
| $CO_2$ | 1.2% | 1% |
| $H_2O$ | 0 | 14% |

The custom gas mixture contained no water or silicon-containing material.

The custom mixture of gases was used as a chemical intermediate for the synthesis of methanol following the teachings of Dienes et al., U.S. Pat. No. 4,279,781, issued July 21, 1981. Dienes et al., disclose the Preparation of methanol via the vapor phase reaction of oxides of carbon and hydrogen in the presence of a solid catalyst which comprises a mixture of oxides of copper and zinc and a thermal stabilizing metal oxide, such as aluminum oxide. The catalyst used, United Catalysts C18HC, was purchased from United Catalysts, Inc., Louisville, Kentucky, was similar to catalysts disclosed in Dienes et al.

The reactor utilized was a closed stainless steel pipe, ¼ inch in diameter and 12 inches long. The reactor was fitted with a conventional pressure control valve to maintain reaction pressure. The opposing end of the reactor was fitted for gas feed. The reactor was placed in an electrically heated tube furnace. The feed gas mixture was passed through a bed of Linde 13X molecular sieves to remove any water. The reactor was filled with approximately 15 grams of the C18HC catalyst. The outlet of the reactor was connected to a gas chromatographic analyzer to analyze the composition of the effluent gases from the reactor.

The reactor was heated to and maintained at a temperature of about 230° C. Reactor pressure was controlled at 750 psig. The gas mixture was fed to the reactor at a flow rate of 75 milliliters per hour.

The mole ratio of hydrogen to carbon monoxide in the mixed feed gas was 0.68/1. Gas chromatographic analyses indicated that, assuming that carbon monoxide and hydrogen react according to the reaction, $$CO + 2H_2 = CH_3OH,$$

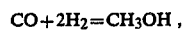

approximately 85 percent of the carbon monoxide that could react with the available hydrogen in the gas mixture did react. Gas chromatographic analyses further showed that the consumption of carbon monoxide could be accounted for by the generation of methanol.

The above results demonstrate that a gas which simulates the composition of the by-product gases from a silicon furnace can be utilized as a chemical intermediate for the production of a useful chemical such as methanol.

What is claimed is:

1. A process for producing silicon via the carbothermic reduction of silicon dioxide, comprising
    (A) providing a closed furnace having a first reaction zone which is supplied with electrical energy,
    (B) providing a second reaction chamber containing a bed of carbon and which is physically separated from said first reaction zone and external to said closed furnace,
    (C) feeding silicon dioxide, silicon carbide, and at least one other solid carbonaceous reducing agent to the furnace as solid reactants, the proportions of silicon dioxide, silicon carbide, and solid carbonaceous reducing agent being controlled so that the silicon dioxide, the silicon carbide, and silicon carbide equivalent of the carbonaceous reducing agent are essentially in stoichiometric balance in said first reaction zone for the overall reaction to produce silicon;

(D) charging the furnace with electrical energy to effect chemical and physical changes to the solid reactants to produce molten silicon in said first reaction zone;

(E) feeding a substantial portion of the total carbon (other than SiC) fed to the overall system, to said second reaction chamber; the total amount of SiC and carbonaceous reducing agents in the overall system formed by both of said chambers being substantially in stoichiometric balance with the total $SiO_2$ being fed to said overall system for the formulation of silicon.

(F) recovering molten silicon from the furnace;

(G) passing by-produced gases containing silicon monoxide from the first reaction zone to the bed of carbon to convert essentially all of the gaseous silicon monoxide to solid silicon carbide said bed containing carbonaceous reducing agent to convert said silicon monoxide to silicon carbide; and (H) supplying the resultant SiC into the fed for said closed furnace.

2. A process according to claim 1, wherein silicon carbide is 10 to 90 percent of total reductant fed to said furnace on a molar carbon basis.

3. A process according to claim 1, wherein silicon carbide is 20 to 50 percent of total reductant fed to said furnace on a molar carbon basis.

4. A process according to claim 2, wherein the furnace is a furnace in which the electrical energy source is a transferred arc plasma.

5. A process according to claim 1, wherein the furnace is a submerged electric arc furnace.

6. A process according to claim 1, wherein the furnace is a transferred arc plasma furnace.

7. A process according to claim 1, wherein the silicon dioxide, silicon carbide, and another solid carbonaceous reducing agent are fed into the furnace as separate feeds.

8. A process according to claim 1, wherein the silicon dioxide, silicon carbide, and another solid carbonaceous reducing agent are fed as a combined mixture into the furnace.

9. A process according to claim 1, wherein the silicon dioxide feed is selected from a group which consists of quartz, fused silica, and fumed silica.

10. A process according to claim 1, wherein the silicon carbide is selected from a group which consists of alpha-silicon carbide and beta-silicon carbide.

11. A process according to claim 1, wherein the solid carbonaceous reducing agent is selected from a group which consists of carbon black, charcoal, coke, coal, and wood.

12. A process according to claim 1, wherein the furnace is maintained at a pressure in the range of atmospheric pressure to 6 atmospheres.

13. A process according to claim 1, wherein the furnace is maintained at a pressure in the range of atmospheric pressure to 6 atmospheric.

14. A process according to claim 1, wherein temperature within the bed of carbon positioned physically separated from the reactor is maintained at a temperature greater than about 1500° C.

15. A process according to claim 1, wherein the process further comprises recovering energy value from the by-produced gases from (F).

16. A process according to claim I, wherein the process further comprises utilizing the by-produced gases from (F) as a chemical intermediate.

17. A process according to claim 16, wherein utilizing the by-produced gases as a chemical intermediate comprises converting the by-produced gas to methanol.

18. A Process according to claim 17, wherein converting the by-produced gases to methanol comprises reacting carbon monoxide in the by-produced gases with hydrogen in the presence of a solid catalyst, said catalyst comprising a major portion by weight of oxides of copper and zinc and a minor portion by weight of a thermal stabilizing metal oxide in addition to the copper oxides and zinc oxides.

* * * * *